United States Patent Office 3,790,509
Patented Feb. 5, 1974

3,790,509
PROCESS FOR THE PRODUCTION OF SYNTHETIC RESINS WHICH CONTAIN ISOCYANURATE GROUPS
Hans-Joachim Diehr, Leverkusen, Germany, assignor to Bayer Aktiengesellschaft, Leverkusen, Germany
No Drawing. Filed June 1, 1972, Ser. No. 258,556
Claims priority, application Germany, June 3, 1971, P 21 27 502.5
Int. Cl. C08g 33/02
U.S. Cl. 260—2.5 AW    4 Claims

ABSTRACT OF THE DISCLOSURE

A process for the production of cellular synthetic resins which contain isocyanurate groups by polymerization of polyisocyanates in the presence of isocyanate polymerization catalysts is provided, characterized in that polymerization is carried out using a quinone of the formulae

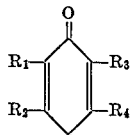  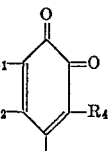  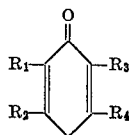

(I)            (II)           (III)

or mixtures thereof in which $R_1$, $R_2$, $R_3$ and $R_4$ are the same or different and represent hydrogen, hydrocarbon radicals containing 1 to 6 carbon atoms, halogen atoms or a nitrile radical or $R_1$ and $R_2$ and/or $R_3$ and $R_4$ represent aromatically condensed cyclic hydrocarbon radicals and R represents hydroxyl, halo or alkylamino substituted aromatic radicals containing 6 to 14 carbon atoms.

The production of synthetic resins by the polymerization of polyisocyanates in the presence of basic catalyst compounds is already known. Compounds which contain more than one NCO group in the molecule are converted by active catalysts such as those described e.g. in Belgian patent specification Nos. 723,153 and 723,152 into polymers with an isocyanurate structure by an exothermic reaction without the supply of additional energy from outside. Polymerization of the polyisocyanates may be carried out in the presence of a blowing agent and other additives, if desired in the presence of compounds which contain active hydrogen atoms. The polyisocyanurate resins produced by this process are notable for their high flame resistance since, when the surface of such synthetic resins is exposed to fire, a layer of carbon is formed which substantially prevents destruction of the layers underneath it. The use of these synthetic resins, especially in the form of foams, as heat insulating materials in the building industry has previously only been possible in special cases, however, because these synthetic resins tend to form cracks when exposed to heat for prolonged periods, thus severely impairing their insulating effect.

It is therefore an object of this invention to provide cellular synthetic resins which contain isocyanurate groups and a process for preparing them which are devoid of the foregoing disadvantages.

It is another object of this invention to provide cellular synthetic resins containing isocyanurate groups which form very stable carbon structures which are not destroyed by heat upon exposure to fire, and a process for preparing them.

A further object of this invention is to provide cellular synthetic resins containing isocyanurate groups which provide very little evolution of fumes upon exposure to fire and a process for preparing them.

A still further object of this invention is to provide cellular synthetic resins containing isocyanurate groups in the forms of elastomers, lacquers, foams and the like which are not destroyed upon exposure to flame and a process for preparing them.

The foregoing objects and others which will become apparent from the following description are accomplished in accordance with this invention, generally speaking, by providing a cellular isocyanurate resin and a method for preparing it in which compounds containing at least two isocyanurate groups are polymerized in the presence of a quinone and a blowing agent. When synthetic cellular resins produced by this process are exposed to fire they form a very stable carbon structure which is not destroyed by heat. Moreover, exposure of the synthetic resins to fire is accompanied by very little evolution of fumes. Accordingly, this invention provides a process for the production of cellular synthetic resins which contain isocyanurate groups, if desired in the form of cellular synthetic resins, by the polymerization of polyisocyanates in the presence of isocyanurate polymerization catalysts in the presence of blowing agents, if desired in the presence of stabilizers and other auxiliary agents and if desired in the presence of less than equivalent quantities of compounds which have active hydrogen atoms, characterized in that polymerization is carried out in the presence of a quinone of formula

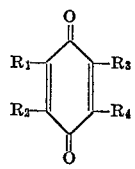  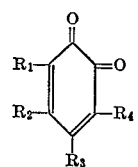  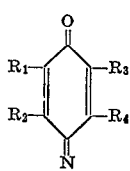

(I)            (II)           (III)

or mixtures of any or all of them in which $R_1$, $R_2$, $R_3$ and $R_4$ are the same or different and represent hydrogen, hydrocarbon radicals having 1 to 6 carbon atoms, halogen atoms or a nitrile group or $R_1$ and $R_2$ and/or $R_3$ and $R_4$ denote a condensed aromatic ring; that is, $R_1$ and $R_2$ may form a ring or $R_3$ and $R_4$ may form a ring or $R_1$ and $R_2$ may form one ring while $R_3$ and $R_4$ form a second ring; and R is a hydroxyl, halo or $C_1$–$C_6$-alkylamino substituted aromatic radical containing six to fourteen carbon atoms.

The starting components used in carrying out the process of this invention may be any aliphatic, cycloaliphatic, araliphatic and/or aromatic polyisocyanates such as, for example, any of those listed in U.S. Pat. 3,350,362, tetramethylene-1,4-diisocyanate, hexamethylene - 1,6 - diisocyanate, dodecane-1,12-diisocyanate, cyclohexane, 1,3-diisocyanate, 1,4-diisocyanate and any mixtures of these isomers, 1-isocyanato-3,3,5-trimethyl-5-isocyanatomethylcyclohexane, phenylene-1,3-diisocyanate and phenylene-1,4-diisocyanate, tolylene-2,4-diisocyanate, tolylene-2,6-diisocyanate and any mixtures of these isomers, hexahydrotolylene-2,4-diisocyanate and hexahydrotolylene-2,4-diisocyanate and any mixtures of these isomers, diphenylmethane-4,4'-diisocyanate, naphthylene-1,5-diisocyanate, triphenylmethane - 4,4',4" - triisocyanate, polyphenyl-polymethylene-polyisocyanates which may be obtained by the condensation of aniline with formaldehyde followed by phosgenation, polyisocyanates which contain carbodiimide diisocyanate adducts such as those obtained according to German patent specification No. 1,092,007, diisocyanates of the type described in U.S. patent specification No. 3,492,330, allophanate polyisocyanates as described in British patent specification No. 994,890, Belgian patent specification No. 761,626 and the published Dutch patent application No. 7,102,524, isocyanurate polyisocyanates as described in German patent specification Nos. 1,022,- 789 and 1,027,394 and in German offenlegungsschrift Nos. 1,929,034 and 2,004,048, biuret polyisocyanates as described in German patent specification No. 1,101,394, in British patent specification No. 889,050 and in French patent specification No. 7,017,514, polyisocyanates prepared by telomerization reactions as described in Belgian patent specification No. 723,640, polyisocyanates containing ester groups, as described in British patent specification Nos. 956,474 and 1,072,956 and aliphatic, cycloaliphatic, araliphatic or aromatic polyisocyanates of the type mentioned by W. Siefgen in Justus Liebig's "Annalen der Chemie" 562, pages 75 to 136 as well as reaction products of the above mentioned isocyanates with acetals according to German patent specification No. 1,072,385 and the isocyanates mentioned in German patent specification Nos. 1,022,789 and 1,027,394 and any mixtures of any desired polyisocyanates. Generally, however, the use of technically readily accessible polyisocyanates such as tolylene-2,4-diisocyanate and tolylene-2,6-diisocyanate and any mixtures of these isomers as well as polyphenyl-polymethylene polyisocyanates which may be prepared by aniline-formaldehyde condensation followed by phosgenation is preferred.

A certain amount of monoisocyanates such as any of those listed in U.S. Pat. 3,350,362 including phenyl isocyanate and naphthyl isocyanate may also be included in amounts up to 50% by weight based on the weight of the polyisocyanate.

The polymerization reaction of the polyisocyanates to form the isocyanurate structure may be carried out in the presence of compounds which contain hydrogen atoms reactive with NCO groups, preferably water. If water is used, however, an additional blowing effect may be achieved. Other organic compounds which contain several active hydrogen atoms which are generally used if water is not employed include polyamines or amino alcohols or preferably low-molecular weight and higher molecular weight hydroxyl compounds or mixtures of any of the foregoing. A wide variety of such compounds are known for the production of polyurethane resins including the usual monoalcohols and polyalcohols such as butanol, cyclohexanol, benzyl alcohol, ethylene glycol, propylene glycol, glycerol, trimethylol propane and their addition products with ethylene oxide and/or propylene oxide. Polyfunctional starting compounds used may be condensation products of the above mentioned polyalcohols with polycarboxylic acids such as adipic, sebacic, maleic, phthalic or terephthalic acid and the like. Numerous such compounds have been described in "Polyurethanes, Chemistry and Technology," vols. I and II, Saunders and Frisch, Interscience Publishers 1962 and 1964 and in Kunststoffhandbuch vol. VII, Vieweg-Hochtlen, Carl Hanser-Verlag, Munich, 1966. Also, any of those active hydrogen containing compounds listed in U.S. Pat. 3,201,372 are suitable. Preferably, however, polyesters or polyethers which contain at least two hydroxyl groups in the molecule and which have a molecular weight of between 500 and 10,000 and preferably between 800 and 6,000 are used.

The process of this invention may be used to produce solid products, lacquers, coatings, foams and cellular products but it is preferably used in the production of foams.

The blowing reaction for producing foam products is carried out by using water and/or other blowing agents. Apart from those blowing agents which decompose to liberate gases such as nitrogen, e.g. azo compounds or sulphonyl azides, the blowing agents used may be low-boiling hydrocarbons and their halogenation products, e.g. halogenated methanes or ethanes, ethylene dichloride, vinylidene chloride and the like. The usual emulsifiers and foam stabilizers may be added to facilitate the foaming reaction, e.g. higher alkyl and aryl sulphonic acids and their salts or sulphuric acid esters of castor oil or ricinoleic acid and their salts, oleic acid salts or stearic acid salts, silicone oils which contain basic groups and mixed condensation products which contain siloxane and alkylene oxide. Any of those blowing agents and emulsifiers suggested in U.S. Pats. 3,201,372 and 3,194,773 are especially suitable.

The catalysts used for the polymerization reactions are compounds which initiate a polymerization reaction of the NCO group at room temperature. Such compounds have been described, for example, in French patent specification No. 1,441,565, Belgian patent specification Nos. 723,153 and 723,152 and U.S. Pat. No. 3,657,161. The usual catalysts used in isocyanate chemistry may also be added, e.g. organic metal compounds, inorganic and organic metal salts, tertiary amines such as dimethyl benzylamine and any of those suggested in U.S. Pats. 3,201,365; 3,194,773; 2,948,928; 2,941,967; 2,948,691 and the like.

The catalysts for the polymerization of NCO into isocyanurate groups are preferably mono-nuclear or poly-nuclear Mannich bases obtained from condensable phenols which are optionally substituted with alkyl, aryl or aralkyl radicals, oxo compounds and secondary amines, especially those in which formaldehyde was used as the oxo compound and dimethylamine was used as secondary amine (see U.S. Pat. specification No. 3,580,890).

The quinones of this invention include compounds of the formulae

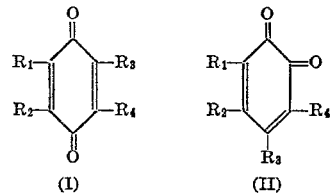

in which the radicals $R_1$, $R_2$, $R_3$ and $R_4$ are the same or different and represent hydrocarbon radicals containing 1 to 6 carbon atoms, hydrogen, halogen (fluorine, bromine, chlorine, iodine) or cyanogen or $R_1$ and $R_2$ and/or $R_3$ and $R_4$ may form an aromatically condensed hydrocarbon ring, and/or $R_3$ and $R_3$ may form an aromatically condensed hydrocarbon ring, e.g. p-benzoquinone, p-chloranil, o-chloranil, p-bromanil, tetraiodo-p-benzoquinone, tetrafluoro-p-benzoquinone, 2,3 - dicyano-p-benzoquinone, 2,6-dichloro-p-benzoquinone, 2,3 - dichloro-1,4-naphthoquinone, 1,2-naphthoquinone, 1,4-naphthoquinone and 9,10-anthroquinone; p-benzoquinone and 1,4-naphthoquinone are preferred.

Quinone imines of the formula

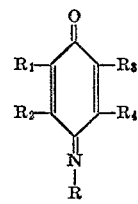

in which $R_1$, $R_2$, $R_3$ and $R_4$ are the same or different and represent hydrogen, hydrocarbon radicals containing 1 to 6 carbon atoms, halogen atoms or cyanogen radicals or $R_1$ and $R_2$ may form an aromatically condensed hydrocarbon ring and/or $R_3$ and $R_4$ may form an aromatically condensed hydrocarbon ring and R is an hydroxylated, halogenated or alkylamino substituted aromatic $C_6$ to $C_{14}$ radical such as, for example,

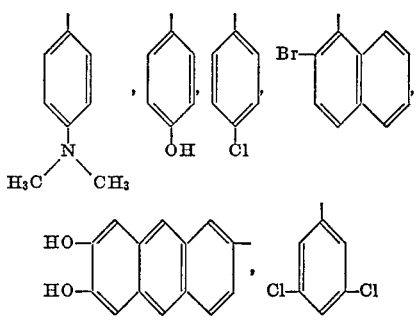

may be used instead of or in addition to the quinones of Formulae I and II.

Production of the foam resins is carried out by the usual and well known method, preferably mechanically, in which the reactants are mixed and the mixture is poured into suitable molds. The quantity of blowing agents used depends on the required density. Generally, between 1 and 100 parts by weight, preferably between 5 and 50 parts by weight of a fluorochloromethane is used or a corresponding quantity of some other blowing agent, based on the amount of isocyanate component. The densities are generally required to be between 15 and 200 kg./m.$^3$ or even higher, preferably between 20 and 200 kg./m.$^3$.

The quantity of compounds containing reactive hydrogen atoms that is used is generally adjusted so that a sufficient quantity of free isocyanate groups are still available for the polymerization reaction but the quantity is preferably so calculated that at least 50% and preferably more than 70% of the total quantity of isocyanate used is available for the polymerization reaction.

The quantity of total catalyst used is largely determined by the nitrogen content and basicity of the catalyst. Between 0.5 and 100% by weight, preferably between 1 and 25% by weight of catalyst component may be used, based on the amount of polyisocyanate. In addition to the components used for production of the synthetic resin, the usual auxiliary agents such as pigments or flame-retarding additives such as antimony, phosphorus or halogen containing compounds may be added.

According to the invention, the quantity of quinone to be used amounts to between 0.05 and 10% by weight, preferably between 0.5 and 3% by weight, based on the weight of the polyisocyanate and, where applicable, the quantity of compounds with active hydrogen atoms.

According to IR spectroscopic analyses, substantial proportions of carbodiimide structures are formed in the foam resins of this invention, the proportion depending on the conditions and especially on the reaction temperature reached. The proportion of carbodiimide structures in the foam resins can be increased by adding the known catalyst used for the preparation of carbodiimides, especially trivalent to pentavalent organic phosphorus compounds such as phospholines, phospholine oxides, tertiary phosphines, (cyclic) esters, amides and ester amides of phosphorous and phosphoric acid and the like. Further details may be found e.g. in "Polyurethanes, Chemistry and Technology," vols. I and II, Saunders and Frisch, Interscience Publishers, 1962 and 1964 and U.S. Pat. 3,657,161.

IR spectroscopic investigation of the resulting synthetic cellular resin products, indicates high proportions of isocyanurate rings in addition to small quantities of carbodiimide groups.

The invention is further illustrated but is not intended to be limited by the following examples in which all parts and percentages are by weight unless otherwise specified.

EXAMPLES

The following compositions are the catalysts used for foaming:

A=Mannich base of
    2 mols of phenol
    4 mols of dimethylamine and
    5 mols of formaldehyde
B=Mannich base of
    2 mols of commercial isononylphenol
    2 mols of dimethylamine and
    2 mols of formaldehyde

Example 1

A prepolymer containing 27.5% of NCO is prepared from crude diphenylmethane-4,4'-diisocyanate (prepared by aniline-formaldehyde condensation followed by phosgenation) and a polyester which has been obtained from 3 mols of trimethylol propane, 4 mols of adipic acid, 3 mols of 1,3-butylene glycol and 1 mol of phthalic acid and which has the OH number 210. Two parts of p-benzoquinone are added to 98 parts of this prepolymer at 60° C. 15 parts of monofluorotrichloromethane are added after cooling, and the solution is introduced with vigorous stirring into a mixture of 4 parts of catalyst A, 14 parts of catalyst B, 4 parts of dimethylbenzylamine, 5 parts of an addition product of trimethylol propane and ethylene oxide (OH number 260), 2 parts of a polysiloxane-polyether copolymer, 0.3 part of acetyl acetone and 5 parts of monofluorotrichloromethane. A tough, hard foam resin which has a very regular and fine cell structure is obtained. Same results are obtained, if instead of 2 parts of p-benzoquinone 2 parts of o-benzoquinone or 2 parts of N-methyl-p-benzoquinoneimine are applied.

Example 2

The method is analogous to that described in Example 1 but instead of using the polyester described there for producing the prepolymer, an addition product of trimethylol propane and ethylene oxide which has an OH number of 260 is used for preparing the prepolymer which has an NCO content of 27.7%, the procedure being otherwise the same.

Example 3

This example is analogous to Example 1 but instead of the polyester described there, an addition product of propylene glycol and ethylene glycol which has an OH number of 190 is used for preparing the prepolymer which has an NCO content of 27.4%, the procedure being otherwise the same.

Example 4

This example is analogous to Example 1 but 2 parts of naphthoquinone-1,4 are added to the NCO prepolymer instead of benzoquinone.

Example 5

A prepolymer containing 9.2% of NCO is prepared from 100 grams of a tolylene diisocyanate mixture (80 parts by weight of 2,4-isomer and 20 parts by weight of 2,6-isomer) and 72.5 grams of an addition product of propylene glycol-1,2 and ethylene oxide with the OH number 80 at 60° C. 7 parts of p-benzoquinone are added to 98 parts of this addition product and the mixture is introduced with vigorous stirring into a mixture of 2 parts of catalyst A, 6 parts of catalyst B, 1 part of N,N', N" - tris-(3-dimethylamino-propyl) hexahydrotriazine, 2 parts of a polysiloxane-polyether copolymer and 20 parts of monofluorotrichloromethane. A hard foam resin which has a regular cell structure is obtained.

Example 6 (comparison example)

Formulation and method of procedure as in Example 2 but no p-benzoquinone is added.

The formulations described above were used for producing sandwich panels measuring 50 x 50 cm. in which the foam had a thickness of 5 cm. and the covering layer of steel a thickness of 0.8 mm. The foam reaction was carried out by means of a conventional foaming machine (HK-machine, system Hennecke, Germany). These structural elements were tested by the regulation supplementary to DIN 4102. The values obtained for prolonged resistance to fire and for the physical properties of the foam resins are summarized in the following table.

polymerized in the presence of less than equivalent quantities of compounds containing hydrogen atoms reactive with NCO groups.

3. The process of claim 2 wherein the active hydrogen containing compound has at least two hydroxyl groups and a molecular weight of 500 to 10,000.

4. A synthetic resin containing isocyanurate groups prepared by the process of claim 1.

| | Density (kg./m.³) | Resistance to bending in the heat, °C., DIN 53421 | Dimensional stability at— | | Proportion of open cells (percent) | Coefficient of thermal conductivity, Kcal./m. (°C.)·hr. | Prolonged fire resistance in minutes [1] | Torch time in minutes | Compression strength (kg. wt./cm.²) |
|---|---|---|---|---|---|---|---|---|---|
| | | | +100° C. | −30° C. | | | | | |
| Example: | | | | | | | | | |
| 1 | 28 | 150–160 | No swelling | No shrinking | 10 | 0.018 | 50–60 | 20 | 1.6–1.8 |
| 2 | 30 | 150–160 | do | do | 9 | 0.018 | 50–60 | 19 | 1.8–2.0 |
| 3 | 32 | 170–180 | do | do | 11 | | 50–60 | 22 | 2.1–2.2 |
| 4 | 30 | 200–210 | do | do | 10 | | 50–60 | 15 | 1.7–1.8 |
| 5 | 34 | 180–190 | do | do | 12 | | 40–50 | 20 | 1.9–2.0 |
| 6 | 31 | 190–200 | do | do | 10 | 0.020 | 22–25 | 6 | 2.3–2.4 |

[1] At a density of 50–55 kg./m.³.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of cellular synthetic resins containing isocyanurate groups which comprises polymerizing organic polyisocyanates with isocyanate polymerization catalysts and 0.5 to 3% by weight of p-benzo-quinone, o-benzo-quinone, 1,4-naphthoquinone or N-methyl-p-benzo-quinoneimine or mixtures thereof in the presence of a blowing agent.

2. The process of claim 1 wherein the polyisocyanate is

References Cited

UNITED STATES PATENTS

| | | | |
|---|---|---|---|
| 3,634,345 | 1/1972 | Diehr | 260—2.5 AW |
| 3,228,780 | 1/1966 | Grelat | 260—2.5 AK |
| 3,221,020 | 11/1965 | Neef | 260—37 N |
| 3,328,385 | 6/1967 | Loeffel | 260—37 N |
| 3,361,765 | 1/1968 | Weber | 260—37 N |
| 3,439,003 | 4/1969 | Reich | 260—37 N |
| 3,701,791 | 10/1972 | Pugin | 260—37 N |
| 3,491,060 | 1/1970 | Schminke | 260—2.5 A |
| 3,445,486 | 5/1969 | Schnabel | 260—2.5 AJ |

FOREIGN PATENTS

| | | | |
|---|---|---|---|
| 1,946,954 | 3/1971 | West Germany | 260—2.5 AJ |

DONALD E. CZAJA, Primary Examiner

C. WARREN IVY, Assistant Examiner

U.S. Cl. X.R.

260—2.5 AJ, 2.5 BB, 2.5 BF, 45.7 R, 45.9 R, 77.5 NC, 77.5 SS